United States Patent
Harrell

(10) Patent No.: US 11,173,576 B1
(45) Date of Patent: Nov. 16, 2021

(54) HOLDING A BUCKET STATIONARY

(71) Applicant: Leon Harrell, Oklahoma City, OK (US)

(72) Inventor: Leon Harrell, Oklahoma City, OK (US)

( * ) Notice: Subject to any disclaimer, the term of this patent is extended or adjusted under 35 U.S.C. 154(b) by 285 days.

(21) Appl. No.: 16/355,283

(22) Filed: Mar. 15, 2019

(51) Int. Cl.
| | |
|---|---|
| *B23Q 3/00* | (2006.01) |
| *B28C 5/08* | (2006.01) |
| *B23Q 3/10* | (2006.01) |
| *B23Q 3/06* | (2006.01) |

(52) U.S. Cl.
CPC ............ *B23Q 3/002* (2013.01); *B23Q 3/064* (2013.01); *B23Q 3/105* (2013.01); *B23Q 3/106* (2013.01); *B28C 5/0856* (2013.01); *B23Q 3/005* (2013.01)

(58) Field of Classification Search
CPC ........ B23Q 3/002; B23Q 3/064; B23Q 3/105; B23Q 3/106; B23Q 3/005; B01F 15/00772; F16B 2/18; F16B 2/185; B28C 5/0856

See application file for complete search history.

(56) References Cited

U.S. PATENT DOCUMENTS

| | | | |
|---|---|---|---|
| 6,227,513 B1 | 5/2001 | Richard | |
| 6,779,915 B2 | 8/2004 | Foster, Jr. | |
| 7,258,312 B2 | 8/2007 | Grosse | |
| 7,494,097 B2* | 2/2009 | Lidie | B01F 15/00733 248/126 |
| 7,494,103 B1* | 2/2009 | Huebner | B01F 15/00733 248/310 |
| 7,540,462 B1 | 6/2009 | Beden | |
| 7,651,060 B2 | 1/2010 | Roth et al. | |
| 8,011,701 B2 | 9/2011 | Taylor | |
| 8,641,005 B2 | 2/2014 | Cimaglio | |
| 8,746,636 B2 | 6/2014 | Rauchut | |
| 8,876,069 B2 | 11/2014 | Cimaglio | |
| 9,004,309 B1 | 4/2015 | Gardner | |
| 9,073,668 B1 | 7/2015 | Catania et al. | |
| 9,573,725 B2 | 2/2017 | Jacobson et al. | |
| 9,975,098 B1* | 5/2018 | Montebello | F16B 2/185 |
| 10,125,916 B1 | 11/2018 | Rogers | |
| 2007/0252051 A1 | 11/2007 | Kuipers | |
| 2016/0051951 A1 | 2/2016 | Gorra et al. | |

\* cited by examiner

*Primary Examiner* — Tyrone V Hall, Jr.
(74) *Attorney, Agent, or Firm* — Robert H. Frantz

(57) ABSTRACT

Apparatus and associated methodology contemplating holding a bucket stationary while a user mixes a substance in the bucket. A rigid base is configured to support the bucket upright upon a predetermined holding zone, and supports a selectively rotatable pivot member. A paddle has a proximal end attached to the pivot member and extends therefrom downwardly toward the base on one side of the pivot member. A foot-actuated lever has a proximal end attached to the pivot member and extends downwardly toward the base on the opposing side of the pivot member.

20 Claims, 11 Drawing Sheets

HOLDING A BUCKET STATIONARY

SUMMARY

Some embodiments of this technology contemplate an apparatus for holding a bucket stationary while a user mixes a substance in the bucket. The apparatus has a rigid base configured to support the bucket upright upon a predetermined holding zone. A pivot member is selectively rotatable around an axis of rotation. A paddle blade surface defining a width extends from the pivot member and terminates at a distal edge defining a thickness, the width larger than the thickness. A lever extends from the pivot member and is selectively moveable to impart a torsion to the pivot member which, in turn, laterally displaces the paddle blade surface toward a sidewall of the bucket in the holding zone. A backstop operably opposes the paddle blade surface lateral displacement, compressing the bucket in the holding zone between the paddle blade surface and the backstop.

Some embodiments of this technology contemplate an apparatus for holding a bucket stationary while a user mixes a substance in the bucket. The apparatus has a rigid base configured to support the bucket upright upon a predetermined holding zone, and a selectively rotatable pivot member. A paddle has a proximal end attached to the pivot member and extends therefrom downwardly toward the base on one side of the pivot member. A foot-actuated lever has a proximal end attached to the pivot member and extends downwardly toward the base on the opposing side of the pivot member.

Some embodiments of this technology contemplate a method for holding a bucket stationary while mixing a substance in the bucket. The method includes steps of: obtaining a device having a rigid base defining a holding zone, a lever and a paddle blade supported by a pivot member above the base, the paddle blade defining a paddle blade surface defining a width and terminating at a distal edge defining a thickness, the width larger than the thickness; placing the bucket on the holding zone; placing a foot on the lever to rotate the pivot member which, in turn, laterally moves the paddle blade surface against a sidewall of the bucket in the holding zone.

BACKGROUND

Construction workers are routinely required to mix small batches of work material, such as grout, mortar, or cement, at the time and where the material is needed on the job site. Workers in this routine will literally spend hours during the day making new small batches, often using a conventional five-gallon plastic bucket. The dry and wet ingredients are added to the bucket, and they're mixed together typically using a hand-held industrial drill equipped with a four-inch mixing paddle or the like.

A longstanding problem in this job is that while mixing the ingredients together, especially at the beginning of a new batch, the torque of the mixing paddle is opposed by the very viscous, nonhomogenous mixture. Especially in this early state of mixing, the torque imparted by the drill transfers through the material and to the bucket, causing it to spin. This creates a potential safety issue, in that the spinning bucket's handle can strike the worker's shins, and any number of muscular-skeletal injuries are caused by trying to hang on to an out of control spinning bucket.

A typical way of addressing this problem is for workers to straddle opposing sides of a bucket with their legs and feet. The amount of human force that's available from this method is usually inadequate to hold the bucket stationary while beginning to mix a new batch in which most or all of the dry ingredients have been added to the wet ingredients in the bucket. Instead, this solution often requires the user to start by adding only a portion of the dry ingredients to the wet ingredients for the initial round of mixing. Then, as a homogenous mixture is obtained, more dry ingredients are added in several intermediate rounds of mixing. The repetitive stresses and strains from the worker using his muscles to both hold the bucket stationary and work on the substance in the bucket makes this a back-wrenching, time-consuming attempted solution.

This brute-force manual procedure remains the typical way of dealing with this problem, indicating there is a need for improvements in the manner of holding a bucket stationary while the user is mixing substances in the bucket. It is to those improvements that embodiments of this technology are directed.

DETAILED DESCRIPTION

Initially, this disclosure is by way of example only, not by limitation. The illustrative constructions and associated methods disclosed herein are not limited to use or application for any specific system or in any specific environment. That is, the disclosed technology is not limited to a human user applying foot pressure to the actuator to hold a bucket in place, as is disclosed in the illustrative environment. Thus, although the instrumentalities described herein are for the convenience of explanation, shown and described with respect to exemplary embodiments, the skilled artisan understands that the operating principles for holding a bucket stationary herein may be applied equally in other types of systems and environments involving automated processes for holding a bucket stationary.

Figure 1:
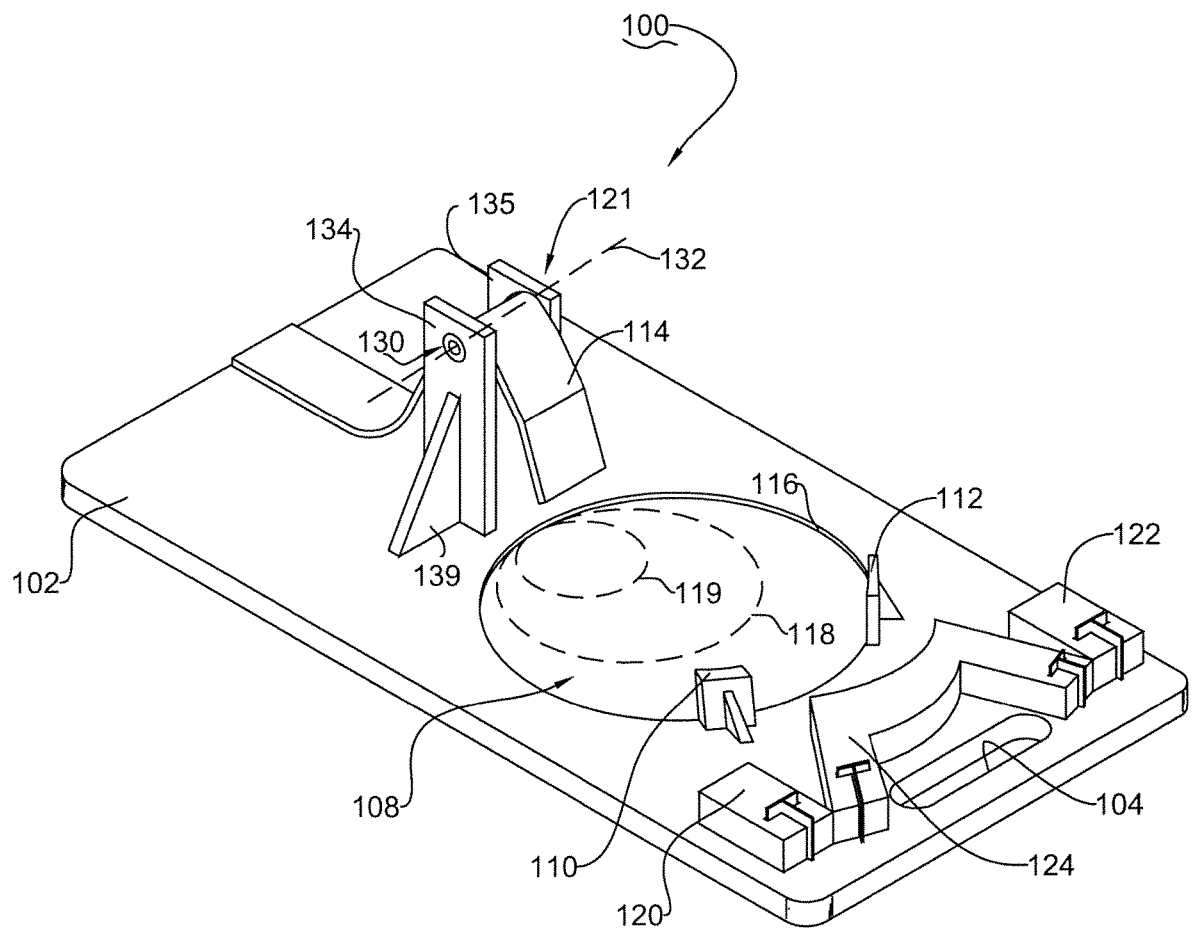
FIG. 1 is an isometric depiction of a bucket holder that is constructed in accordance with illustrative embodiments of this technology.

FIG. 1 generally depicts a bucket holder 100 that is constructed in accordance with illustrative embodiments of this technology. In these illustrative embodiments a compact, lightweight rectangular base 102 is constructed of a rigid material such as an ABS, polypropylene, or polyamide and the like. These embodiments contemplate a portable apparatus suited for being hand-carried to a worksite for use. To that end, the base 102 can advantageously be sized approximately fourteen inches wide and approximately twenty-four inches long. An opening 104 can be formed in the base 102 as a hand hold for transporting the bucket holder 100, or for hanging it while being stored between uses. The portable embodiments of this description are merely illustrative, not limiting of the claimed embodiments. For instance, in alternative embodiments not depicted the bucket holder's base can be formed as part of a larger stationary structure, such as being incorporated within machinery framework in factory process equipment in which a bucket is handled, or where multiple buckets are handled simultaneously.

In any event, the base 102 provides a stable foundation for supporting the bucket 106 (see FIG. 5) upright upon a predetermined holding zone 108. The holding zone 108 in these illustrative embodiments lies between a pair of stationary backstops 110, 112 and a selectively movable paddle 114. A recess 116 can be formed into the top surface of the base 102 to further facilitate guiding the bucket 106 into the proper position for holding it stationary in accordance with this technology. Indicia 118, 119 can be provided as well, such as the broken-line circles depicted. In these illustrative embodiments, the recess 116 identifies the holding zone for a five-gallon bucket, whereas indicia 118, 119 identify the holding zones for a two-and-a-half-gallon and a one-gallon bucket, respectively. Placed in its loading zone, a five-gallon bucket is directly supported by the stationary backstops 110, 112, whereas the smaller buckets are supported by additional blocks 120, 122, 124 placed between them and the stationary backstops 110, 112, as described in detail below.

To hold the bucket 106 stationary while mixing a substance inside it, the user first places the bucket in the holding zone 108 and then actuates a pivot assembly 121 to laterally displace the paddle 114 toward the bucket 106, compressing the bucket 106 between the paddle 114 and the stationary backstops 110, 112. The pivot assembly 121 has a pivot 130 defining a horizontal axis of rotation 132, and is supported above the base 102 by opposing upstanding stanchions 134, 135. Gusset brackets 139, 141 tie the respective stanchions 134, 135 to the base 102 for added strength and rigidity.

Figure 2:
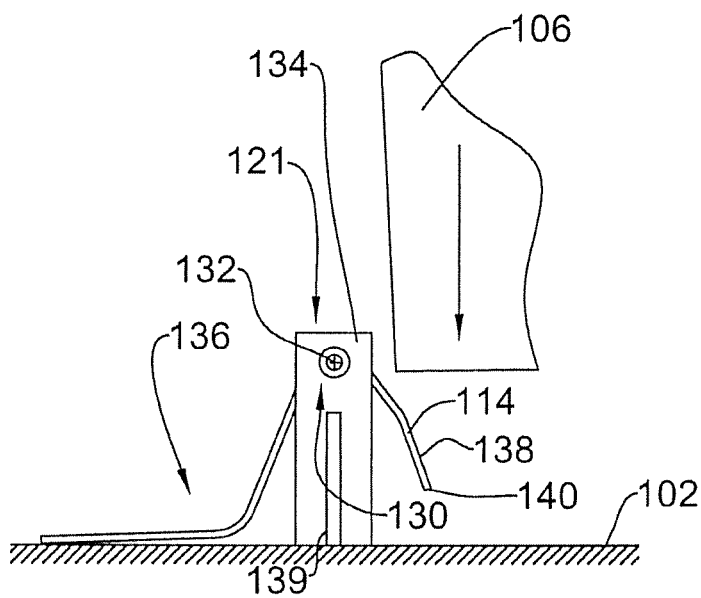
FIGS. 2-4 are diagrammatic depictions of the bucket 106 being sequentially lowered onto the base portion of the bucket holder in FIG. 1.
Figure 3:
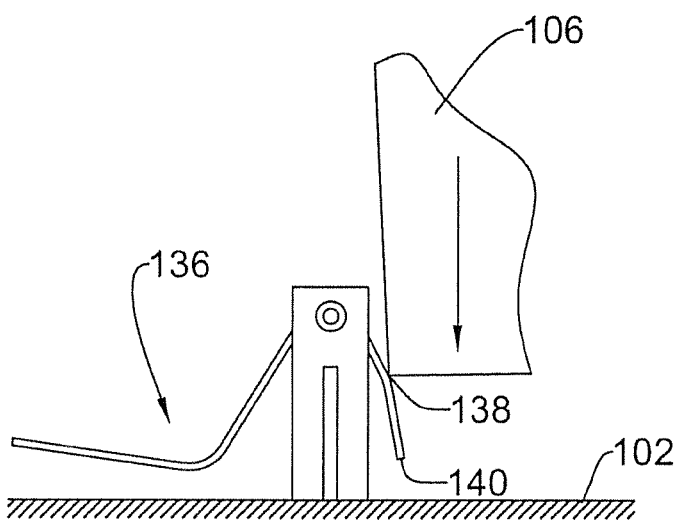
Figure 4:
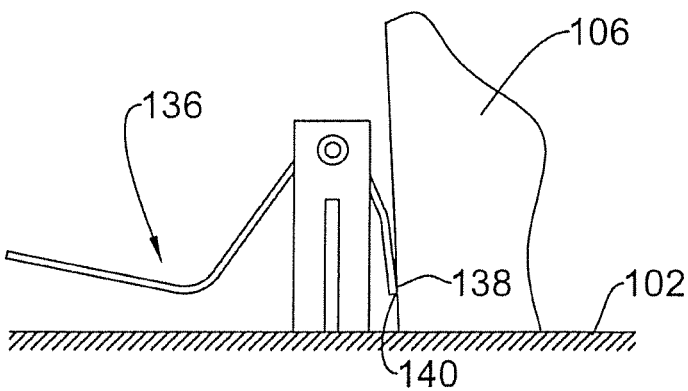

The pivot 130 rotationally supports the paddle 114 on one lateral side of the horizontal axis of rotation 132, and supports an actuator 136 on the opposing lateral side. FIGS. 2-4 diagrammatically depict sequential steps of placing the bucket 106 upon the base 102 in accordance with illustrative embodiments of this technology. FIG. 2 depicts the bucket 106 at a time when it is entirely above the pivot assembly 121 while being lowered vertically, as indicated by the downwardly-pointing arrow on the bucket 106. In these illustrative embodiments, the actuator 136 is heavier than the paddle 114 so that in a natural resting state the actuator 136 rotates downwardly around the pivot 130 by the force of gravity, ultimately resting on the base 102. This places the paddle 114 in the bucket 106's path of travel as it is lowered onto the base 102. In alternative embodiments discussed below, the actuator 136 can be biased so that the paddle 114 is retracted out of the bucket 106's path of travel in its natural resting position.

Continuing on to FIG. 3, depicting the bucket 106 having been lowered further to the point that it is contacting a paddle blade surface 138 portion of the paddle 114. The paddle blade surface 138 is ultimately purposed to frictionally contact laterally against the bucket 106 to hold it stationary while the user mixes the substance in the bucket 106. To that end, the paddle blade surface 138 can be contoured to match the sidewall surface of the bucket 106. In these illustrative embodiments, the paddle blade surface 138 also contacts the bucket 106 as it is being lowered onto the base 102. As such, the paddle blade surface 138 is disposed on the high end at least to where the bucket 106 makes initial contacting engagement, extending longitudinally therefrom toward the base 102 and ultimately terminating at a distal transverse edge 140.

Figure 5:
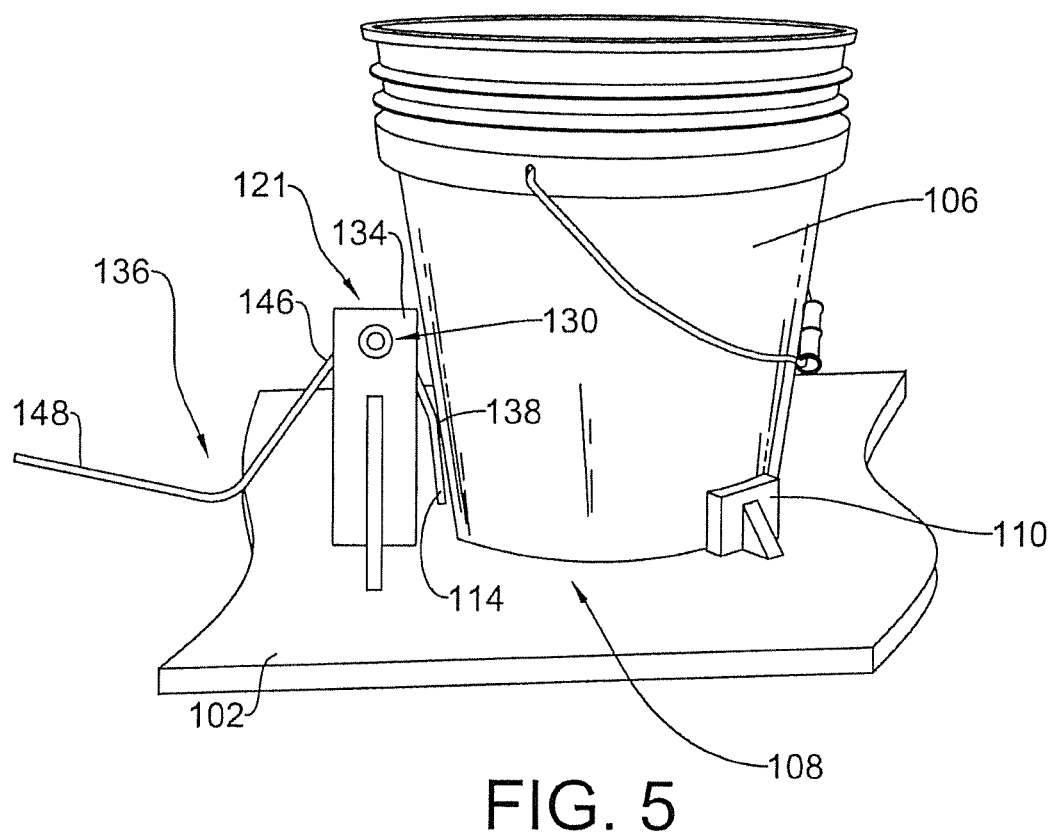
FIG. 5 depicts an enlarged portion of the bucket holder in FIG. 1 with a bucket in place on the bucket holder's base.

Comparing FIGS. 2 and 3 indicates how lowering the bucket 106 against the paddle blade surface 138 in these illustrative embodiments causes a rotation of the paddle 114 in a clockwise direction. That rotation imparts torsion to the pivot 130 that, in turn, raises the actuator 136. FIG. 4 depicts the maximum rotation that is achieved by the bucket 106 reaching the base 102, where it is upright and stably supported thereon. FIG. 5 presents the same condition of the bucket as FIG. 4, where the bucket 106 is in the holding zone 108 and ready for being held stationary while the user mixes substances inside the bucket 106.

Figure 6:
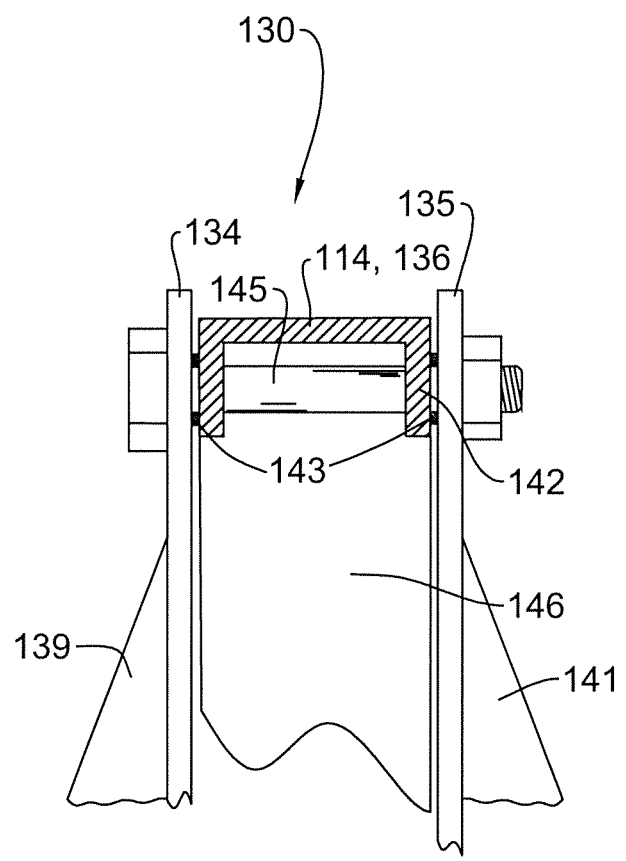
FIG. 6 is a partial vertical cross-sectional depiction of the pivot portion of the bucket holder in FIG. 1.

FIG. 6 is a vertical cross-sectional depiction taken through the pivot 130. Staying with FIG. 6 and also considering FIG. 7, a pivot member 142 in these illustrative embodiments defines a circular bearing surface 144 that is sized to rotate around a pivot shaft 145 in a close-mating relationship. This makes the pivot member 142 selectively rotatable above the base 102 and around the horizontal axis of rotation 132. Thrust bushings 143 between the pivot member 142 and the stanchions 134, 134 provide for smooth, reduced-frictional rotation.

The paddle blade 114 is contiguously joined to the pivot member 142, meaning they are directly joined to each other without separation and without any other intermediate connecting part. The paddle blade 114 and the pivot member 142 can advantageously be unitarily constructed. Note that in these illustrative embodiments the paddle blade surface 138 extends all the way up to the pivot member 142, although the contemplated embodiments are not so limited. As previously discussed, the paddle blade surface 138 need only extend so high as to where the bucket 106 might contact it when being lowered onto the base 102.

Figure 7:
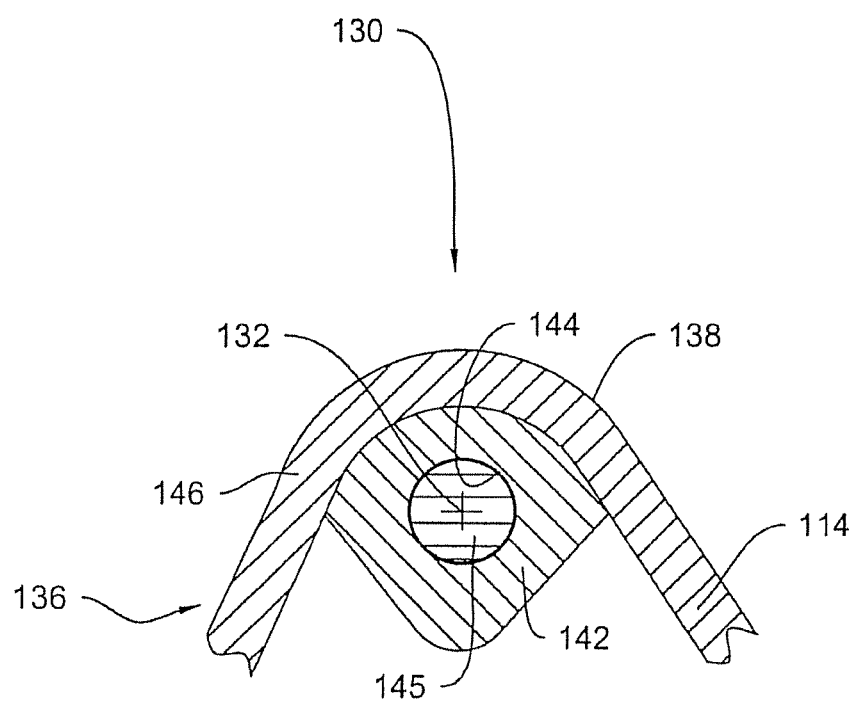
FIG. 7 is a lateral cross-sectional depiction of the pivot portion of the bucket holder in FIG. 1.

Continuing with FIGS. 6 and 7 along with recalling FIG. 5, in these illustrative embodiments the actuator 136 is configured to be foot-operated. To that end, the actuator 136 has a lever 146 portion contiguously joined to the pivot member 142 and extending longitudinally therefrom toward the base 102, ultimately terminating at a transverse foot pedal 148. The foot pedal 148 is configured to present an ergonomic surface for a user to apply a downward foot force. That downward force imparts a counter-clockwise-directed torsion to the pivot member 142 that, in turn, transfers to a counter-clockwise rotation of the paddle 114 urging the paddle blade surface 138 laterally against the bucket 106 to hold it stationary.

Figure 8:
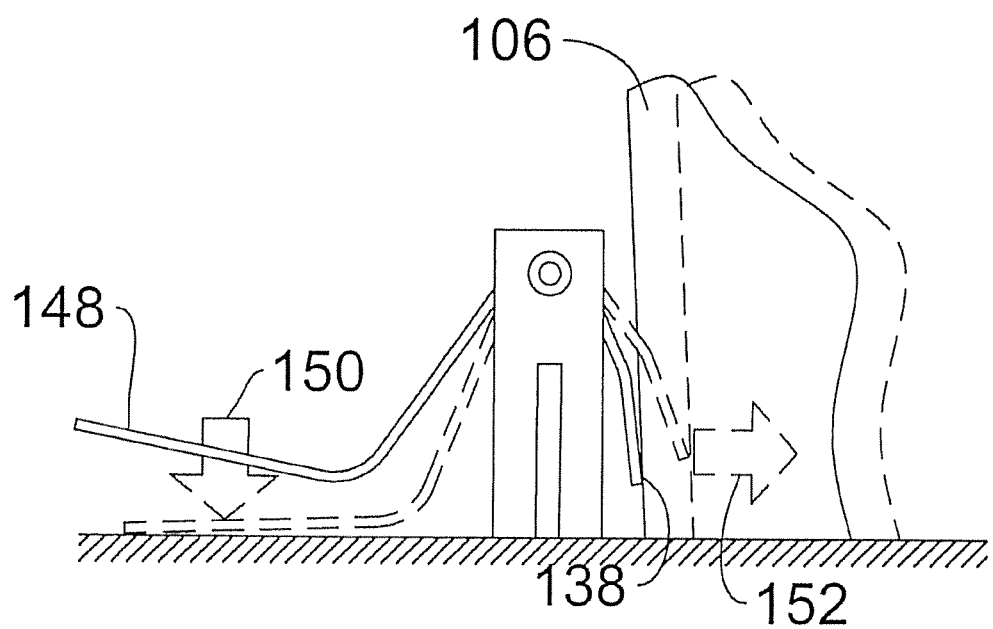
FIG. 8 diagrammatically depicts the lateral movement of the paddle portion of the bucket holder in FIG. 1 from the unclamped position depicted in solid lines and the clamped position depicted in broken lines.

FIG. 8 summarizes the disclosure set forth above by depicting the relative dispositions of the pedal 148, paddle blade surface 138, and bucket 106 both before (in solid lines) and after (in broken lines) the user's foot force is applied to hold the bucket 106 stationary. The user applying the downward foot force 150 on the pedal 148 urges the paddle blade surface 138 to apply a predominantly lateral force 152 against the bucket 106, compressing the bucket 106 between the paddle blade surface 138 and the stationary backstops 110, 112 adequately to hold the bucket 106 stationary while the user mixes the substances in the bucket 106.

As described above, in some illustrative embodiments the actuator 136 is heavier than the paddle 114, so that the pedal 148 rotates downwardly onto the base 102 by the force of gravity. That places the paddle 114 in the bucket 106's path of travel toward the base 102, as depicted in FIGS. 2-4. In alternative embodiments, the paddle 114 can be biased downwardly away from the bucket 106's path of travel in its natural resting position, such as by spring-loading, or by a different weight distribution, and the like.

Figure 9:
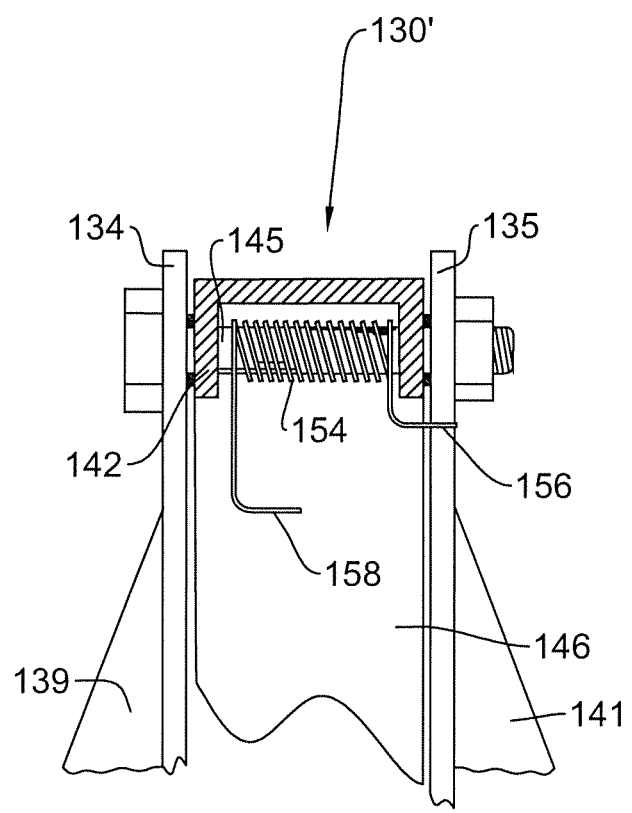
FIG. 9 is similar to FIG. 6 but with a torsion spring added to bias the paddle blade portion downwardly in the bucket holder in FIG. 1.
Figure 10:
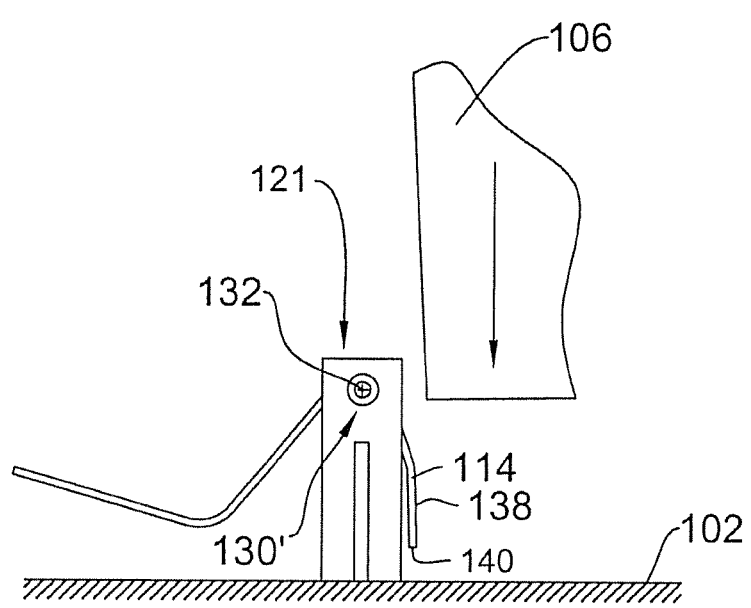
FIG. 10 is similar to FIG. 2 but with the alternative construction of the pivot in FIG. 8.

FIG. 9, for example, is a modified version of FIG. 6, depicting a torsion spring 154 that is wound and pre-loaded around the pivot shaft 145. One end 156 of the spring 154 is retained against the upstanding edge of the stanchion 135, and the other end 158 of the spring 154 is retained against the inner surface of the lever 146. The wound-up spring 154 produces a torsion that raises the actuator 136 and lowers the paddle 114 in the natural resting state. FIG. 10 is similar to FIG. 2 but depicting the modified construction including the spring-biased pivot 130' of FIG. 9. These illustrative embodiments permit the user to simply place the bucket 106 on the base 102 without contacting the paddle 114 on the way down.

Figure 11:
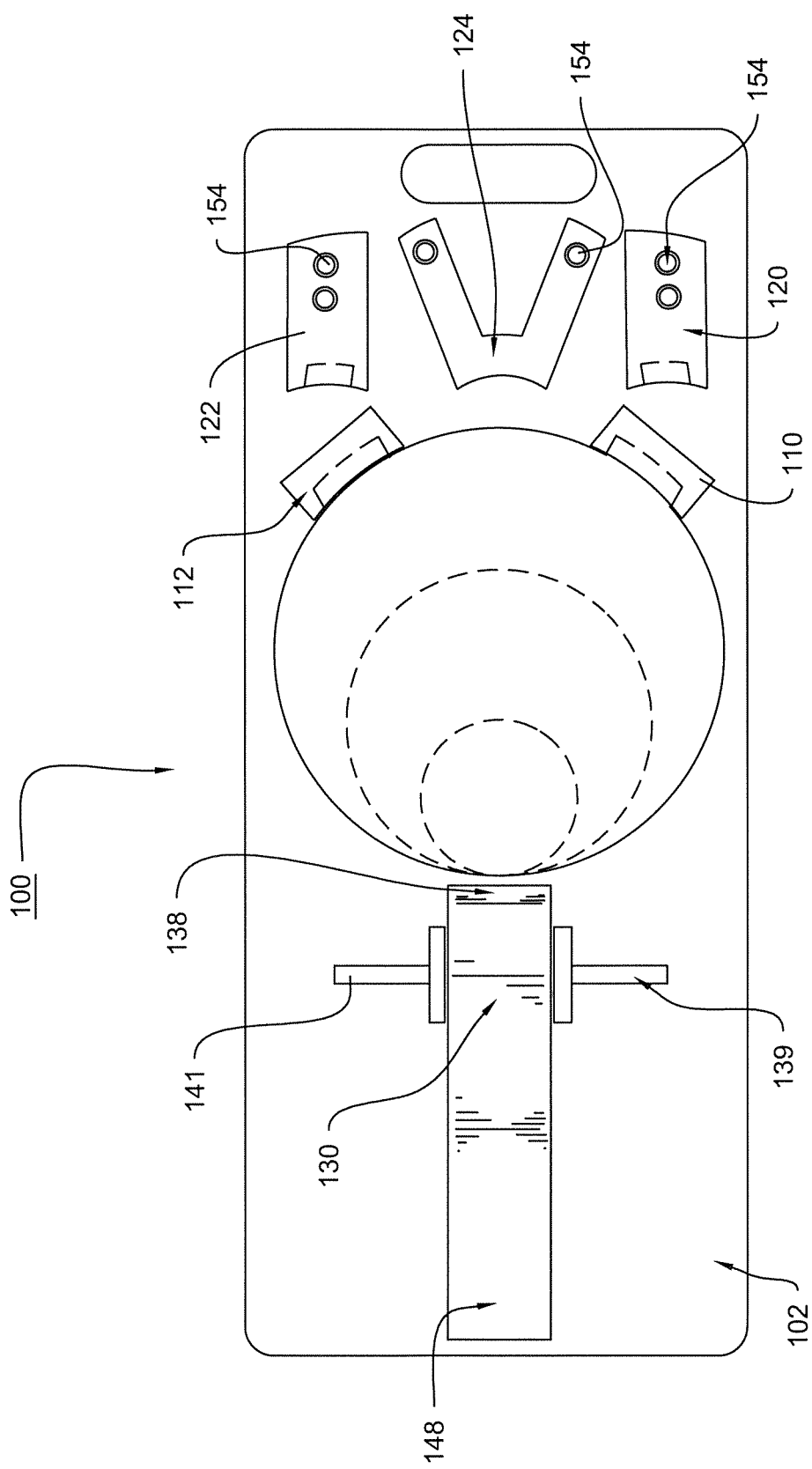
FIG. 11 is a top depiction of the bucket holder in FIG. 1.

FIG. 11 depicts a top view of the bucket holder 100 in accordance with these illustrative embodiments where the spacer blocks 120, 122, 124 have circular openings for storing them on cylindrical posts 154 extending from the base 102. The configuration of FIG. 11 is used with a five-gallon bucket 106 that is clamped between the paddle blade surface 138 and the stationary backstops 110, 112.

Figure 12:
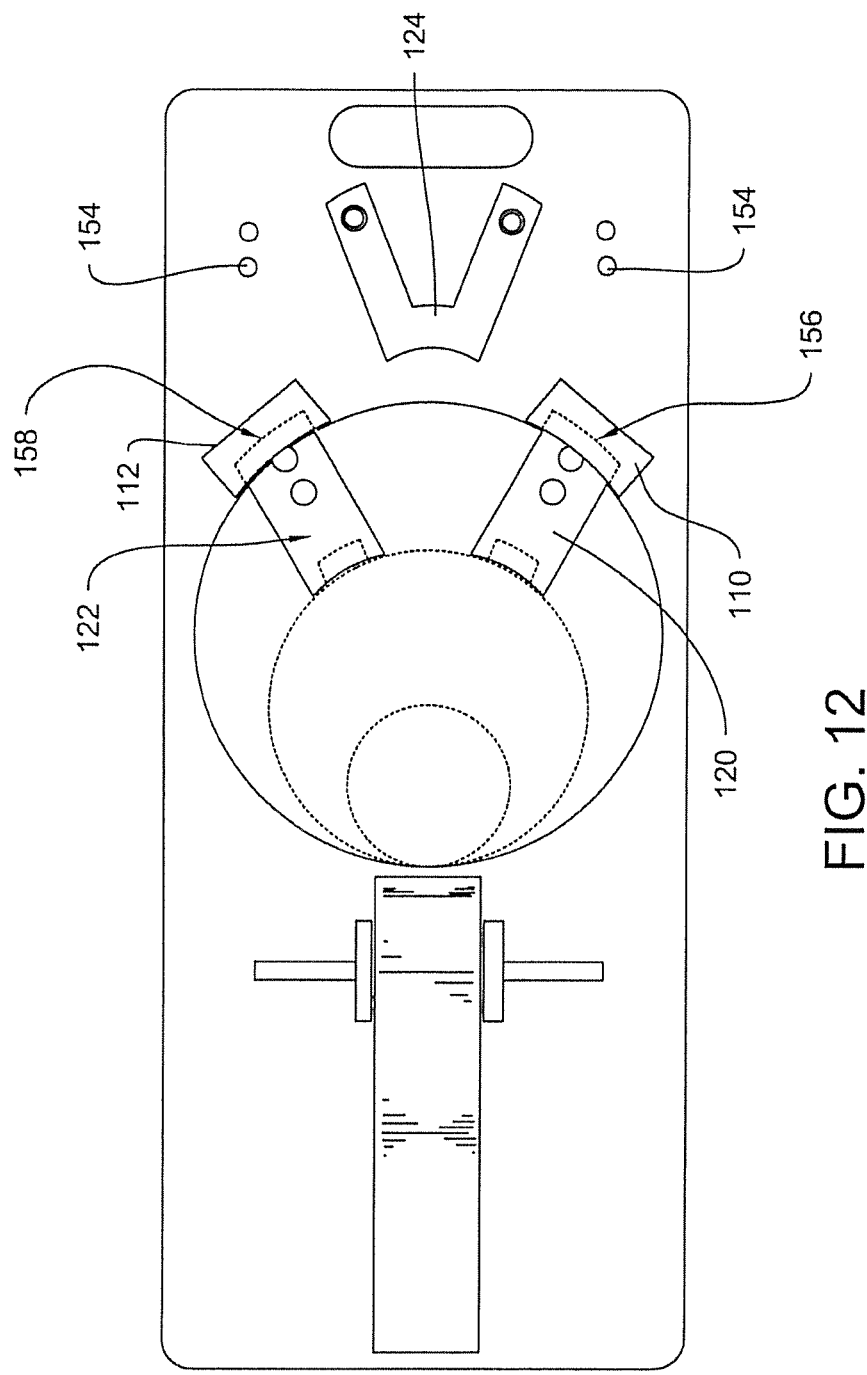
FIG. 12 is similar to FIG. 11 but depicting some of the spacer blocks in use for mixing a substance in a smaller bucket.
Figure 13:
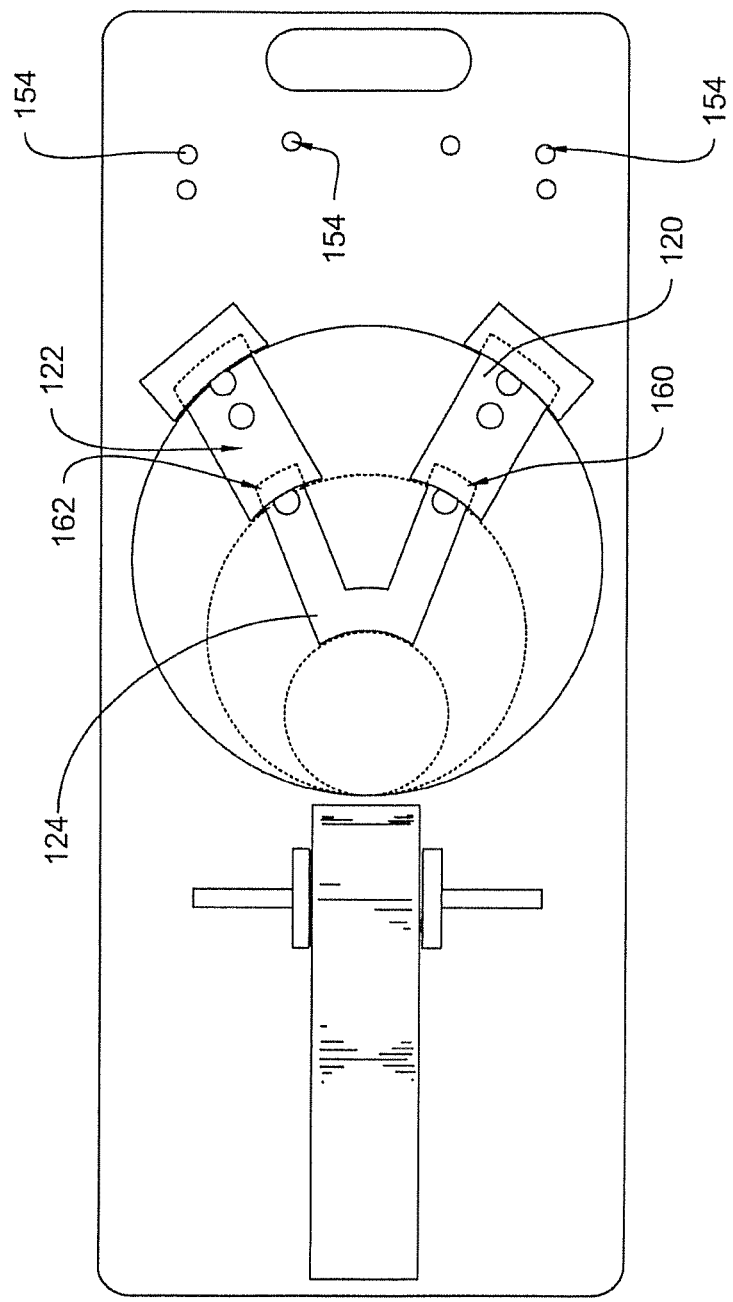
FIG. 13 is similar to FIG. 11 but depicting all of the spacer blocks in use for mixing a substance in even a smaller bucket.

FIG. 12 is similar to FIG. 11 but depicting the configuration for use with the medium-size bucket. In these illustrative embodiments, the stationary backstops 110, 112 each form a respective internal cavity 156, 158 that is sized to receivingly engage the respective ends of the spacer blocks 120, 122. FIG. 13 is similar to FIG. 12 but depicting the configuration for use with the smallest-size bucket. In these illustrative embodiments, the opposing ends of the spacer blocks 120, 122 likewise form a respective internal cavity 160, 162 that is sized to receivingly engage the respective ends of the bifurcated spacer block 124. The circular openings of FIGS. 11-13, the T-shaped openings of FIG. 1, and the internal cavities in the spacer blocks 120, 122, 124 for stacking them end-to-end are all merely illustrative of the contemplated embodiments and in no way limiting of the scope of the claimed embodiments.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. An apparatus for holding a bucket stationary while a user mixes a substance in the bucket, comprising:
a rigid base configured to receive a bucket of at least a first size upright upon at least one predetermined holding zone;
one or more upright stanchions rising vertically from a top surface of the rigid base;
a pivot member that is selectively rotatable around an axis of rotation, supported by the one or more upright stanchions at a height above the top surface of the rigid base;
a paddle blade surface extending from the pivot member and terminating at a distal edge;
a lever extending from the pivot member and selectively moveable to impart a torsion to the pivot member which, in turn, causes lateral displacement of the paddle blade surface toward the at least one holding zone; and
a backstop operably opposing the paddle blade surface lateral displacement, thereby configured to compress a bucket received in the holding zone between the paddle blade surface and the backstop, wherein the height of the pivot member above the top surface of the rigid base defined by the one or more upright stanchions exceeds 2.25" to provide a paddle blade lateral displacement of 0.75" or more, thereby accommodating variations of diameter of the first size of buckets of at least 0.75".

2. The apparatus of claim 1 wherein the at least one holding zone comprises at least one recess formed in the top surface of the rigid base.

3. The apparatus of claim 1 wherein the one or more upright stanchions defines a height of the pivot member above the top surface of the rigid base of at least 2.5".

4. The apparatus of claim 3 comprising a thrust bushing between the pivot member and the stanchion.

5. The apparatus of claim 1 comprising a spring biasing the paddle blade surface away from the holding zone.

6. The apparatus of claim 5 wherein the pivot member comprises a bearing surface.

7. The apparatus of claim 6 wherein the bearing surface is cylindrical and configured to rotate around a shaft.

8. The apparatus of claim 7 wherein the spring comprises a torsion spring wound around the shaft.

9. The apparatus of claim 1 further comprising a foot pedal attached to the lever configured to present an ergonomic surface for a user to selectively apply a downward foot force against to move the lever while mixing the substance in the bucket.

10. The apparatus of claim 1 further comprising a plurality of bucket holding zones, each holding zone corresponding to a different volume of bucket and further, comprising a plurality of spacer blocks configured to engage as a backstop for one or more additional volume sizes of buckets.

11. An apparatus for holding a bucket stationary while a user mixes a substance in the bucket, comprising:
a rigid base configured to receive a bucket of at least a first size upright upon at least one predetermined holding zone;
one or more upright stanchions rising vertically from a top surface of the rigid base;
a selectively rotatable pivot member, supported by the one or more upright stanchions at a height above the top surface of the rigid base;
a paddle having a proximal end attached to the pivot member and extending therefrom downwardly toward the base on one side of the pivot member terminating in a distal end;

a foot-actuated lever having a proximal end attached to the pivot member and extending downwardly toward the base on the opposing side of the pivot member, wherein actuation of the lever causes lateral displacement of the distal end of the paddle of at least 0.75" towards the at least one predetermined holding zone, thereby accommodating variations of diameter of the first size of buckets of at least 0.75".

12. The apparatus of claim 11 comprising at least one backstop configured to engage a bucket received in the at least one holding zone.

13. The apparatus of claim 11 wherein the at least one predetermined holding zone comprises at least one recess formed in the top surface of the rigid base.

14. The apparatus of claim 11 wherein the one or more upright stanchions support the pivot member at a height of at least 2.25" above the top surface of the base.

15. The apparatus of claim 14 comprising a spring biasing the paddle away from the the at least one predetermined holding zone.

16. The apparatus of claim 15 wherein the pivot member comprising a bearing surface configured to rotate around a shaft.

17. The apparatus of claim 16 wherein the spring comprises a torsion spring wound around the shaft.

18. The apparatus of claim 11 wherein the paddle and the foot-actuated lever are unitarily constructed.

19. The apparatus of claim 18 wherein the paddle and the foot-actuated lever have a substantially constant thickness.

20. The apparatus of claim 11 further comprising a plurality of bucket holding zones, each holding zone corresponding to a different volume of bucket, and further comprising a plurality of spacer blocks configured to engage as a backstop for one or more additional sizes of buckets.

* * * * *